3,177,778
ACCELEROMETER
Arthur E. Brown, Orlando, Fla., and Edward C. Ehlke, Brookfield, Wis., assignors to General Motors Corporation, Detroit, Mich., a corporation of Delaware
Original application Sept. 11, 1958, Ser. No. 760,514, now Patent No. 3,092,167, dated June 4, 1963. Divided and this application Sept. 27, 1962, Ser. No. 226,671
7 Claims. (Cl. 91—366)

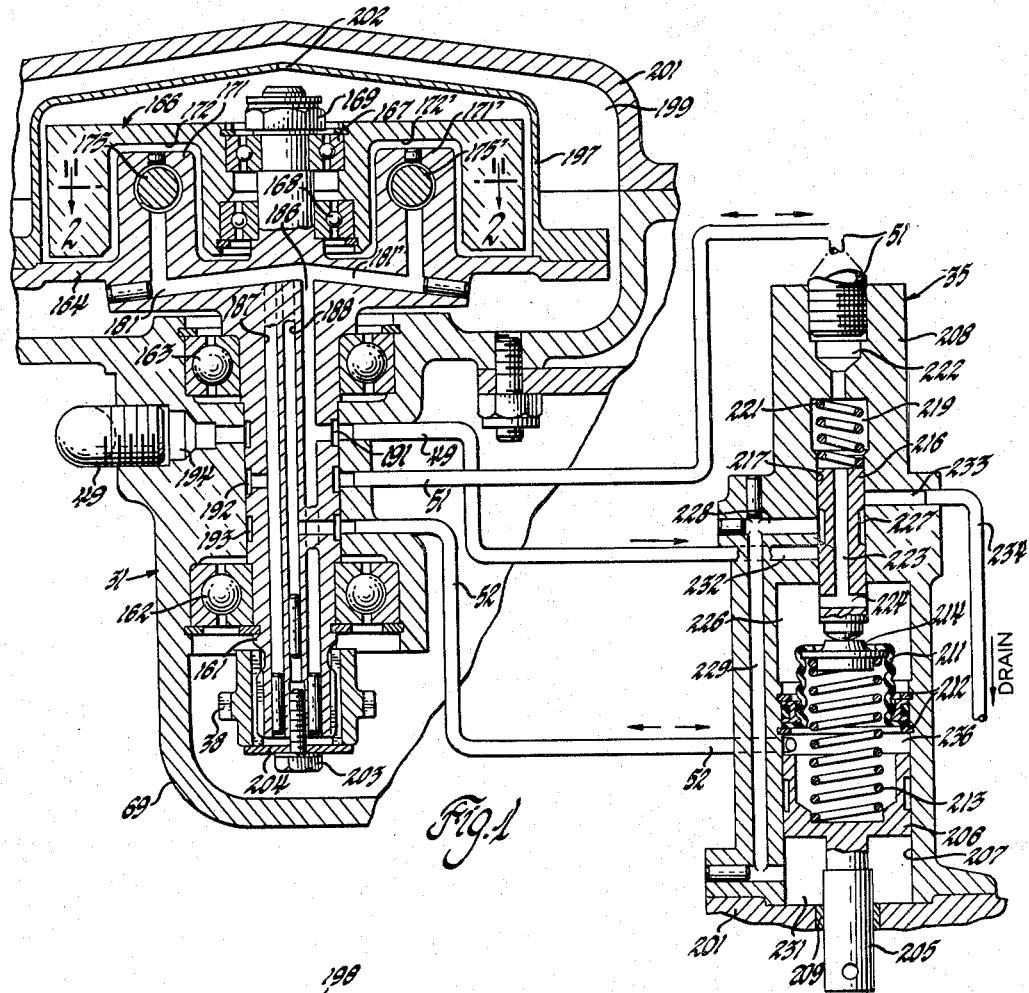

This application is a division of our application Serial No. 760,514 for Speed Rate Fuel Control, filed September 11, 1958 (Patent No. 3,092,167).

It is directed to an accelerometer particularly suited for incorporation in gas turbine fuel controls, but generally useful otherwise. This specification omits the disclosure of the fuel control mechanism other than the accelerometer.

The present invention is an accelerometer comprising a sensing head and a servomechanism which drives an output member to a position representing acceleration of the sensing head and therefore a driving engine or the like.

The foregoing will indicate generally the nature of the invention. The nature and advantages of the invention will be fully apparent to those skilled in the art from the succeeding detailed description of a preferred embodiment of the invention.

Referring to the drawings illustrating the preferred embodiment of the invention:

FIGURE 1 is a sectional view of the accelerometer.

FIGURE 2 is a sectional view of the accelerometer head taken on the plane indicated by the line 2—2 in FIGURE 1.

FIGURE 3 is a detail sectional view taken on the plane indicated by the line 3—3 in FIGURE 2.

The accelerometer comprises an acceleration head or sensor 31 and the servomechanism or output device 35. The acceleration head generates fluid pressures indicative of acceleration and the servomechanism 35 moves an output member to a position indicative of the amount of acceleration.

Considering first the acceleration head which may be driven by an engine, for example, the gear 38, which may be driven to provide the input, is fixed to an accelerometer shaft 161 rotatably mounted in a case 69 by ball bearings 162 and 163 retained by snap rings. The accelerometer shaft 161 is integral with a flange or head 164. An inertia wheel or flywheel 166 is rotatably mounted on the upper end of shaft 161 by ball bearings 167 and 168. The outer races of these bearings are retained in the inertia wheel by snap rings and the bearings are retained on shaft 161 by a nut 169.

The inertia wheel 166 is driven by shaft 161 through hydraulic torque measuring means. The torque required to drive the wheel 166 is proportional to acceleration, and this torque determines hydraulic pressures which provide a measure of acceleration. These pressures control the acceleration servo 35, to be described, which controls the position of a movable member. Two bosses 171 and 171' project from the upper surface of flange 164 into recesses 172 and 172' in the wheel 166. Each of these bosses is provided with a blind bore which receives a plunger. Referring to FIGURES 2 and 3, the boss 171 has a blind bore 174 within which is reciprocably mounted a plunger 175, one end of which abuts the surface 176 of the recess 172. It will be noted that the plunger is perpendicular to a radial line drawn from its point of engagement with surface 176 to the axis of rotation. Two grooves 177 and 178 on the plunger define lands at each end of the plunger and a central land 179. Servo fuel under controlled pressure is supplied through a passage 181 in the head which communicates with the groove 177. A controlled pressure passage 182 registers with, and is substantially coextensive with, land 179. A branch passage 183 connects passage 182 with chamber 184 behind plunger 175. The ends of the bores which provide these passages are closed by plugs brazed in place. An exhaust port 185 communicates with groove 178. The plunger and valve arrangement 175' in the boss 171' is identical to that just described, but acts in the opposite direction. Passages 181 and 181' connect with a passage 186 extending through the shaft 161 and closed at its lower end by a brazed plug. Passages 182 and 182' communicate respectively with passages 187 and 188 extending through the shaft 161 and closed at the lower end of the shaft by plugs. Radial passages or ports connect the passages 186, 187 and 188, respectively, with grooves 191, 192, and 193 in the outer surface of shaft 161. Groove 191 is connected by a port 194 in the case to a controlled pressure line 49 leading from a regulating valve (not shown). Groove 191 also connects to the continuation of line 49 which conducts the controlled pressure to the accelerometer servo 35. Grooves 192 and 193 connect to lines 51 and 52.

A few further structural details of the accelerometer may be mentioned. The inertia weight 166 is mounted in an enclosure defined by flange 164 and an annular cover 197 fixed to the flange 164 by a ring of bolts 198. The inertia head rotates in a closed chamber 199 defined by the case 69 and a cover 201 suitably fixed to the case. This chamber remains full of fuel which exhausts from the bores 174, and is vented by an opening 202 in cover 197 on the axis of shaft 161. The drive gear 38 is retained on shaft 161 by a cap screw 203 threaded into the end of the shaft and a washer 204.

Proceeding now to the operation of the acceleration head to generate the acceleration responsive pressures, it will be remembered that the pressure in passages 181 and 181' is controlled to a desired value. Referring to FIGURES 2 and 3, if the inertia wheel moves counterclockwise with respect to the shaft (positive acceleration of the engine), plunger 175 will move to the left in FIGURE 3 to admit fluid under pressure from passage 181 to passage 182 and chamber 184. This pressure acting on the end of plunger 175 provides a torque against the inertia wheel. If the inertia wheel rotates clockwise with respect to the shaft, plunger 175 will move to the right as shown in FIGURE 3, connecting chamber 184 through passages 183 and 182 and groove 178 of the plunger to the drain outlet 185. When shaft 161 is rotated at constant speed and the system is stable, the torque required to turn the inertia wheel is a negligible value and the two plungers 175 and 175' will be in their neutral position. The pressures in lines 182 and 182' will be substantially balanced, and the force exerted by the plungers 175 and 175' on the inertia wheel will be substantially equal. The actual pressures in lines 182 and 182' will be some value lower than that in the supply passages 181 and 181', since fluid may leak from these passages and from chamber 184 into the drain 185. If the shaft 161 accelerates, the inertia wheel lags slightly, operating valve 175 to increase the pressure in chamber 184 and operating valve 175' to decrease the pressure in chamber 184'. The difference between the pressures in the two chambers is proportional to the torque required to accelerate the inertia wheel. This action is accompanied by very slight angular displacement of the inertia wheel with respect to the shaft, which displacement is immaterial. If shaft 161 decelerates, the reverse action takes place. It will be seen, therefore, that the inertia head responds equally well to positive or negative accelerations.

We may now consider the acceleration servo 35 which acts to displace a piston rod 205 in either direction from a neutral position by an amount proportional to the acceleration of shaft 161 and, therefore, of the engine. Rod 205 is integral with a piston 206 reciprocable in a cylinder 207 defined by housing 208 mounted on the cover 201 by bolts or other suitable means (not shown). The lower end of the cylinder is defined by the cover 201, and the piston rod reciprocates in a bushing 209. Above piston 206 in cylinder 207, an expansible bellows 211 is mounted by snap rings 212. A compression spring 213 is disposed in a recess in the upper face of the piston 206 and extends to bear against the head 214 of the bellows. A pilot valve spool 216 is reciprocable in a valve bore 217 coaxial with cylinder 207. The upper end of the valve spool communicates with the chamber 219 within which is mounted a compression spring 221 biasing the spool downwardly. Accelerometer pressure line 51 is connected through a port 222 to chamber 219. The valve spool has a central passage 223 and radial ports 224 which connect chamber 219 with a chamber 226 above the bellows 211. A groove 227 in the valve spool is in communication through a port 228 and passage 229 with the chamber 231 below the piston 206. The controlled pressure fluid line 49 terminates in a port 232 immediately below groove 227 when the spool 216 is in its neutral position. A port 233 immediately above groove 227 when the spool is in its neutral position connects to a drain line 234 which may connect to the interior of the case 69, which is drained. Accelerometer pressure line 52 connects to a chamber 236 between piston 206 and bellows 211.

Proceeding to the operation of the acceleration servo, it may be pointed out that valve spool 216 is hydraulically balanced, having equal pressures on both ends. The pressure exerted on the upper end of bellows 211 is that in line 51 connected to the chamber 184 of the acceleration head. The pressure exerted on the lower face of bellows 211 and on the upper face of piston 206 is that in line 52 which is connected to chamber 184' of the acceleration head. The pressure in chamber 231 below piston 206 may be varied between the controlled servo fuel pressure in line 49 and the pump inlet pressure of drain line 234. The device is coupled to the engine so that shaft 161 rotates clockwise as viewed in FIGURE 2 and, therefore, positive acceleration of the engine results in increasing pressure behind plunger 175 and thereby increasing pressure in line 51, and in decreasing pressure in line 52. Thus, the pressure in chamber 226 above bellows 211 becomes greater than that in chamber 236 below the bellows. As a result, head 214 will move downwardly, compressing spring 213, and spring 221 will move valve spool 216 downwardly, connecting pressure fluid port 232 with the chamber 231 below piston 206. The piston will move upwardly, compressing spring 213 and extending bellows 211 until the valve spool 216 has returned to neutral position. The greater the acceleration, the greater the difference in pressure on the two sides of bellows 211 and the higher piston 206 will rise to compress spring 213 to balance these pressures. Thus the displacement of stem 205 is proportional to acceleration.

If the engine decelerates, pressure in chamber 236 is greater than that in chamber 226 and the bellows moves valve spool 216 upwardly, connecting chamber 231 to the drain line 233 and allowing the piston 206 to descend until spring 213 is relaxed sufficiently to allow bellows 211 to collapse sufficiently to close the drain from chamber 231.

When the acceleration is zero, the pressures in chambers 226 and 236 are equal and the force exerted by spring 221 equals that exerted by spring 213 when valve spool 216 is in neutral position so that the bellows is in balance. The force exerted by spring 221 is constant except for the intermittent variation due to the slight movement of the valve spool. Likewise, the position of head 214 is constant under any steady state condition of acceleration or deceleration and varies only sufficiently to operate the valve spool. Piston 206 acts, therefore, to load spring 213 to compensate for the difference in pressure, either positive or negative, between chambers 226 and 236. Piston rod 205 provides the acceleration output, which may be an input to a fuel control, for example.

It will be apparent to those skilled in the art that our accelerometer is particularly suited to the requirements of practice in such environments as engine fuel controls.

The foregoing detailed description of the preferred embodiment of our invention, for the purpose of explaining the principles thereof, is not to be construed as limiting the invention.

We claim:

1. An accelerometer comprising, in combination, a rotatably mounted shaft adapted to be driven, a head on the shaft rotatable therewith, means for supplying servo fluid, an inertia wheel rotatably mounted on the shaft adjacent the head, two tangentially disposed plungers reciprocably mounted in the head and engaging the inertia wheel for transmission of torque between the head and wheel, the plungers acting in opposition, the head defining a chamber behind each plunger, each plunger defining with the head valve means controlling supply of servo fluid to the chamber in response to displacement of the plunger to oppose the torque-generated force on the plunger, a fixed cylinder, first and second movable wall means dividing the cylinder into three spaces, an output member extending from one end of the cylinder through the first said space and coupled to the first wall means, the second said space being between the wall means, resilient means coupled to the wall means biasing the wall means apart, the third said space being between the second wall means and the other end of the cylinder, resilient means biasing the second wall means toward the first wall means, means connecting one said chamber to the second space, means connecting the other said chamber to the third space, and valve means supplied with servo fluid coupled to the second wall means actuated by displacement of the second wall means to supply and discharge servo fluid to and from the first chamber.

2. An accelerometer comprising, in combination, a rotatably mounted shaft adapted to be driven, an inertia wheel rotatably mounted on the shaft, two tangentially disposed plungers reciprocably mounted on the shaft and engaging the inertia wheel for transmission of torque between the shaft and wheel, the plungers acting in opposition, the shaft defining a chamber behind each plunger, each plunger defining with the shaft valve means controlling supply of servo fluid to the chamber in response to displacement of the plunger to oppose the torque-generated force on the plunger, and a force balance output servomechanism responsive to the difference of the pressures in said chambers.

3. An accelerometer comprising, in combination, a rotatably mounted shaft adapted to be driven, a head on the shaft rotatable therewith, means for supplying servo fluid to the head, an inertia wheel rotatably mounted on the head adjacent the head, two tangentially disposed plungers reciprocably mounted in the head and engaging the inertia wheel for transmission of torque between the head and wheel, the plungers acting in opposition, the head defining a chamber behind each plunger, each plunger defining with the head valve means controlling supply of servo fluid to the chamber in response to displacement of the plunger to oppose the torque-generated force on the plunger, means connecting the said chambers to the exterior of the shaft, and a force balance output servomechanism responsive to the difference of the pressures in said chambers connected to the connecting means.

4. An accelerometer comprising, in combination, a rotatably mounted shaft adapted to be driven, a head on the shaft rotatable therewith and defining an enclosure, means for supplying servo fluid to the head, an inertia wheel rotatably mounted on the shaft within the enclosure, two tangentially disposed plungers reciprocably mounted in the head and engaging the inertia wheel for transmission of torque between the head and wheel, the plungers acting in opposition, the head defining a chamber behind each plunger, each plunger defining with the head valve means controlling supply of servo fluid to the chamber and exhaust thereof from the chamber into the enclosure in response to displacement of the plunger to oppose the torque-generated force on the plunger, the enclosure having a vent on the shaft axis, means connecting the said chambers to the exterior of the shaft, and a force balance output servomechanism responsive to the difference of the pressures in said chambers connected to the connecting means.

5. A servomechanism adapted to move a displaceable member from a datum position in response to the difference of two controlling pressures comprising, in combination, means defining a space, first and second movable wall means dividing the space into three chambers, the first and second chambers being separated by the first wall means and the second and third chambers being separated by the second wall means, an output member coupled to the first wall means, resilient means coupled to the wall means biasing the wall means apart, resilient means biasing the second wall means toward the first wall means, means supplying the first controlling pressure to the second chamber and the second controlling pressure to the third chamber, means for supplying servo fluid under pressure, and valve means coupled to the second wall means actuated by displacement of the second wall means to supply and discharge servo fluid to and from the first chamber.

6. A servomechanism adapted to move a displaceable member from a datum position in response to the difference of two controlling pressures comprising, in combination, a cylinder, first and second movable wall means dividing the cylinder into three chambers, an output member extending from one end of the cylinder through the first said chamber and coupled to the first wall means, the second said chamber being between the wall means, resilient means coupled to the wall means biasing the wall means apart, the third said chamber being between the second wall means and the other end of the cylinder, resilient means biasing the second wall means toward the first wall means, means supplying the first controlling pressure to the second chamber and the second controlling pressure to the third chamber, means for supplying servo fluid under pressure, and valve means coupled to the second wall means actuated by displacement of the second wall means to supply and discharge servo fluid to and from the first chamber.

7. A servomechanism adapted to move a displaceable member from a datum position in response to the difference of two controlling pressures comprising, in combination, a cylinder, first and second movable wall means dividing the cylinder into three chambers, an output member extending from one end of the cylinder through the first said chamber and coupled to the first wall means, the second said chamber being between the wall means, resilient means coupled to the wall means biasing the wall means apart, the third said chamber being between the second wall means and the other end of the cylinder, a movable valve member engaging the second wall means, resilient means biasing the valve member toward the second wall means and the second wall means toward the first wall means, means supplying the first controlling pressure to the second chamber, and the second controlling pressure to the third chamber, means for supplying servo fluid under pressure to the valve member, the valve member being actuated by displacement of the second wall means to supply and discharge servo fluid to and from the first chamber.

References Cited by the Examiner
UNITED STATES PATENTS

| | | | |
|---|---|---|---|
| 2,411,748 | 11/46 | Kelly | 91—387 X |
| 2,633,830 | 4/53 | McCourty et al. | 137—48 X |
| 2,672,335 | 3/54 | Keller | 73—515 X |
| 2,817,318 | 12/57 | MacKenzie et al. | 91—387 X |
| 2,867,194 | 1/59 | Jensen | 91—387 X |
| 2,887,119 | 5/59 | Lee | 137—48 |

FRED E. ENGELTHALER, *Primary Examiner.*

UNITED STATES PATENT OFFICE
CERTIFICATE OF CORRECTION

Patent No. 3,177,778                          April 13, 1965

Arthur E. Brown et al.

It is hereby certified that error appears in the above numbered patent requiring correction and that the said Letters Patent should read as corrected below.

Column 1, line 17, for "mechanism" read -- mechanisms --; column 4, line 62, for "head", first occurrence, read -- shaft --.

Signed and sealed this 21st day of December 1965.

(SEAL)
Attest:

ERNEST W. SWIDER
Attesting Officer

EDWARD J. BRENNER
Commissioner of Patents